(12) United States Patent
Hurley

(10) Patent No.: US 7,627,218 B2
(45) Date of Patent: Dec. 1, 2009

(54) RETRACTABLE OPTICAL FIBER TETHER ASSEMBLY AND ASSOCIATED FIBER OPTIC CABLE

(75) Inventor: William Carl Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 71 days.

(21) Appl. No.: 11/891,008

(22) Filed: Aug. 8, 2007

(65) Prior Publication Data

US 2009/0041413 A1 Feb. 12, 2009

(51) Int. Cl.
*G02B 6/00* (2006.01)
*G02B 6/44* (2006.01)

(52) U.S. Cl. .......................... 385/101; 385/88; 385/89; 385/100; 385/102; 385/113; 385/114; 385/134; 385/135; 385/136; 385/137

(58) Field of Classification Search ............. 385/88–89, 385/100–102, 109, 113–114, 134–137
See application file for complete search history.

(56) References Cited

U.S. PATENT DOCUMENTS

2007/0036506 A1* 2/2007 Kewitsch .................... 385/135

* cited by examiner

*Primary Examiner*—Frank G Font
*Assistant Examiner*—Michael P Mooney
(74) *Attorney, Agent, or Firm*—C. Keith Montgomery

(57) ABSTRACT

The present invention provides an optical system that allows for the flexible location of an optical device that is coupled to a patch panel in a wiring closet or other optical signal source through a series of fiber optic cables and optical connections, or the flexible location of an array of such optical devices. The optical system includes, in part, one or more retractable optical fiber tether assemblies that each allow varying lengths of tether cable to be pulled and used. The retraction device of each of the optical tether assemblies may be disposed mid-tether cable, or may terminate the respective tether cable and incorporate the given optical device. In an exemplary wireless local area network (WLAN) application, each of the retractable optical fiber tether assemblies includes an integral transceiver and associated software. Thus, each of the retractable optical fiber tether assemblies functions as an antenna. The associated fiber optic cable carries both optical fiber to provide optical continuity and copper wire to provide electrical conductivity to the antenna array.

9 Claims, 10 Drawing Sheets

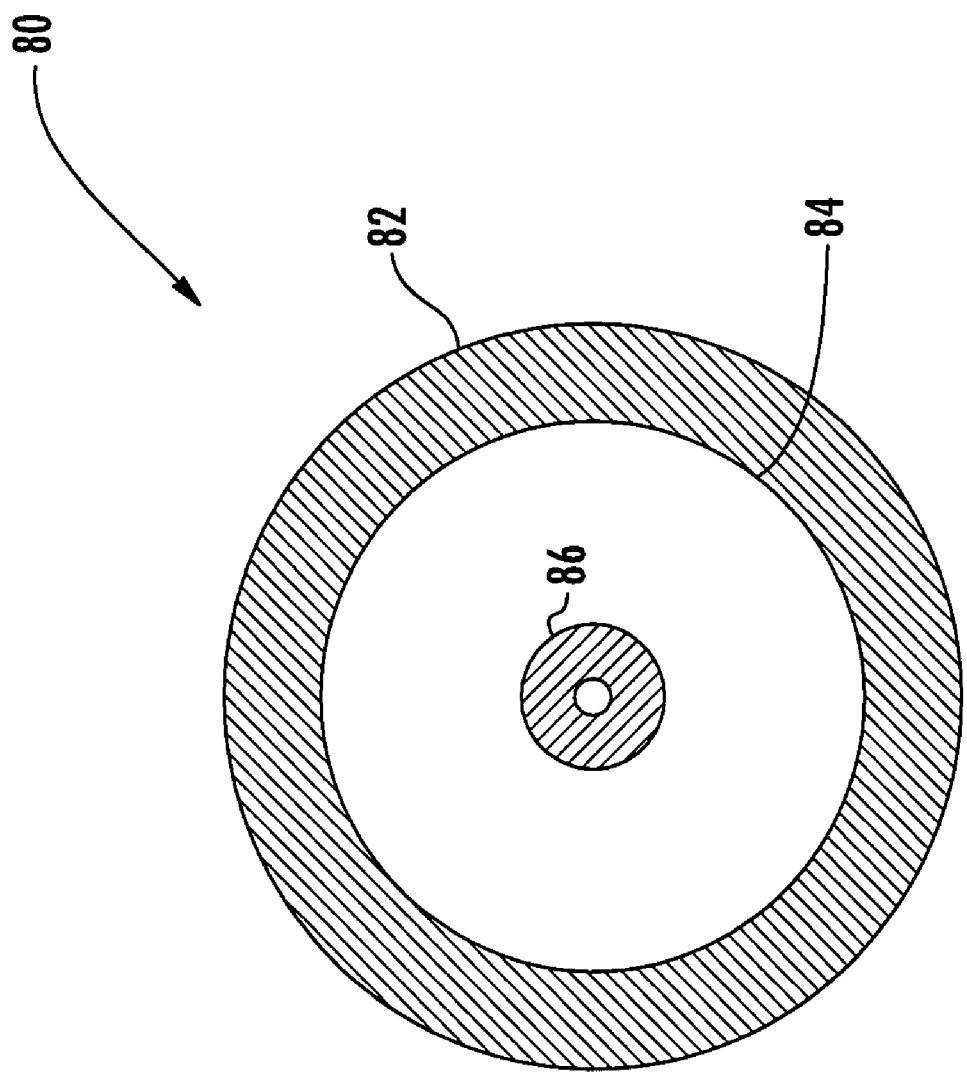

RETRACTABLE OPTICAL FIBER TETHER ASSEMBLY AND ASSOCIATED FIBER OPTIC CABLE

BACKGROUND OF THE INVENTION

1. Field of the Invention

The present invention relates generally to an assembly that allows for the flexible location of an optical device within an optical communications network, and more specifically to a retractable optical fiber tether assembly and the associated fiber optic cable. In one exemplary application, a plurality of these retractable optical fiber tether assemblies are used to flexibly deploy an antenna array for a wireless local area network (WLAN) or the like, the associated fiber optic cable carrying both optical fiber to provide optical continuity and copper wire to provide electrical conductivity to the antenna array.

2. Technical Background of the Invention

In various applications, it is desirable to flexibly locate an optical device that is coupled to a patch panel in a wiring closet or other optical signal source through a series of fiber optic cables and optical connections, or to flexibly locate an array of such optical devices. For example, on a campus or in an office building, multiple-dwelling unit (MDU), single dwelling, etc., it is often desirable to flexibly locate an optical connector or port, a flexible network access point (FlexNap—Corning Incorporated), or the like in each building, office suite, office, unit, room, etc. As used herein, the terms "flexible," "flexibly," and "flexibility" refer to the ability to select the end location of the optical connector or port, FlexNap, or the like without significant constraint caused by the fixed length of the terminating portion of the cable (i.e. the tether or drop cable) or the placement of the originating or intervening portions of the cable (i.e. the tail cable or array cable).

In a conventional installation, the tail cable optically couples the patch panel in the wiring closet or other optical signal source to multiple optical connectors at a different location. For example, in an office building, the patch panel may be located in a wiring closet in the basement or on the ground floor and the optical connectors may be on a higher floor having multiple office suites. The array cable optically couples the optical connectors to multiple tether cables at multiple access points, such as multiple FlexNaps or the like. In the office building, the array cable may run through the wall or ceiling of a hall connecting the office suites, an access point associated with each of the office suites. The tether cables, which are preferably pre-connectorized, then bring the optical signal into each of the office suites. Disadvantageously, the tether cables typically each have a fixed length, dictating the end locations of the optical connectors or ports, FlexNaps, or the like, or requiring that excess tether cable be neatly coiled in each of the office suites. Thus, what is needed in the art is an optical system that incorporates one or more retractable optical fiber tether assemblies, providing the desired location flexibility and obviating the need for neatly coiling the tether cable, such that an array of optical devices may be installed with minimal effort and expense.

What is also needed in the art is an optical system that incorporates one or more retractable optical fiber tether assemblies, such that an antenna array for a WLAN or the like may be flexibly deployed. In such an application, the associated fiber optic cable must carry both optical fiber to provide optical continuity and copper wire to provide electrical conductivity to the antenna array. Optical fiber and copper wire are carried separately in existing solutions.

One approach to deploying a wireless communications system involves the use of "picocells," which are radio-frequency (RF) coverage areas having a radius in the range of about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

In conventional wireless communications systems, picocells are created by and centered on a wireless access point device connected to a head-end controller. The wireless access point device includes digital information processing electronics, an RF transmitter/receiver (transceiver), and an antenna operably connected to the RF transceiver. The size of a given picocell is determined by the amount of RF power transmitted by the access point device, the transceiver sensitivity, the antenna gain, and the RF environment, as well as by the RF transceiver sensitivity of the wireless client device. Wireless client devices typically have a fixed RF transceiver sensitivity, so that the above-referenced properties of the access point device mainly determine the picocell size. Combining a number of access point devices connected to the head-end controller creates an array of picocells that cover an area called a "picocellular coverage area." A closely packed picocell array provides high per-user data throughput over the picocellular coverage area.

Conventional wireless systems and networks are wire-based signal distribution systems where the access point devices are treated as separate processing units linked to a central location. This makes the wireless system/network relatively complex and difficult to scale, particularly when many picocells need to cover a large region. Further, the digital information processing performed at the access point devices requires that these devices be activated and controlled by the head-end controller, which further complicates the distribution and use of numerous access point devices to produce a large picocellular coverage area.

While radio-over-fiber (RoF) wireless picocellular systems are generally robust, there are some limitations. One limitation relates to the radiation pattern from the transceiver antenna. Though microstrip antennas have a directional radiation pattern, they are generally more expensive and more complicated to integrate into a RoF cable than the simpler and less expensive dipole antennas. However, dipole antennas in the form of wires radiate omnidirectionally in a plane perpendicular to the RoF cable. This wastes energy and also interferes with other picocells, such as those formed in the floor above the ceiling in which the RoF cable is deployed.

Another limitation relates to the need for having a transceiver for each picocell. The typical RoF transceiver includes a mechanical housing, a laser, a photodetector, a printed circuit board with RF electronics, optical connectors, and electrical connectors. The relatively small size of picocells typically requires that the transceivers be spaced apart by between about 5 to 10 meters or so. A RoF wireless picocellular system would be easier to deploy and be less expensive if the number of transceivers could be reduced.

A further limitation relates to locating RoF transceivers after they are deployed. The typical RoF wireless picocellular system includes one or more RoF cables that are hidden in a building's infrastructure, such as above a suspended ceiling. This makes it difficult for service personnel to locate a problematic transceiver. One way of deploying transceivers is to tether them to respective access points in the RoF cable using a tether cable. However, the position of each transceiver relative to the RoF cable tends to be different, requiring different lengths of tether cable. This requires that the slack in some of the tether cables be addressed by coiling the tether or otherwise storing the excess tether cable. In addition, tether cabling needs to be packaged for shipping in a manner that lends itself to ease of installation since quicker system installation translates into cost savings.

BRIEF SUMMARY OF THE INVENTION

In various exemplary embodiments, the present invention provides an optical system that allows for the flexible location of an optical device that is coupled to a patch panel in a wiring closet or other optical signal source through a series of fiber optic cables and optical connections, or the flexible location of an array of such optical devices. The optical system includes, in part, one or more retractable optical fiber tether assemblies that each allow varying lengths of tether cable to be pulled and used. The retraction device of each of the optical tether assemblies may be disposed mid-tether cable, or may terminate the respective tether cable and incorporate the given optical device. In the exemplary WLAN application, each of the retractable optical fiber tether assemblies includes an integral transceiver and associated software. Thus, each of the retractable optical fiber tether assemblies functions as an antenna. The associated fiber optic cable carries both optical fiber to provide optical continuity and copper wire to provide electrical conductivity to the antenna array.

In one exemplary embodiment, the present invention provides an optical system, including: a fiber optic cable; a retractable fiber optic cable storage device operatively associated with the fiber optic cable; an optical device operatively associated with the fiber optic cable; and a fiber optic array cable coupled to the fiber optic cable at an access point; wherein the retractable fiber optic cable storage device is operatively associated with the fiber optic cable such that the optical device may be flexibly located relative to the fiber optic array cable and the access point. The fiber optic cable is a fiber optic tether cable. The retractable fiber optic cable storage device is operable for selectively storing, reeling out, and reeling in the fiber optic cable. Optionally, the retractable fiber optic cable storage device is disposed along a middle-portion of the fiber optic cable and the optical device is disposed at a terminating portion of the fiber optic cable. Alternatively, the retractable fiber optic cable storage device and the optical device are disposed at a terminating portion of the fiber optic cable. In the later case, the retractable fiber optic cable storage device and the optical device may be disposed within an integrated housing. Optionally, the fiber optic cable includes at least one optical fiber and at least one conductive wire, and wherein the fiber optic cable has a predetermined spring characteristic. The optical device includes one of an optical connector, an optical port, a flexible network access point, and a transceiver.

In another exemplary embodiment, the present invention provides a retractable optical fiber tether assembly, including: a housing; and a retraction mechanism disposed within the housing; wherein the retraction mechanism is operable for selectively storing, reeling out, and reeling in a fiber optic cable, and wherein the fiber optic cable has a predetermined bending characteristic. The retractable optical fiber tether assembly also includes an optical device. Optionally, the housing and retraction mechanism are disposed along a middle-portion of the fiber optic cable and the optical device is disposed at a terminating portion of the fiber optic cable. Alternatively, the housing, the retraction mechanism, and the optical device are disposed at a terminating portion of the fiber optic cable. In the later case, the retraction mechanism and the optical device are disposed within an integrated housing. Optionally, the fiber optic cable includes at least one optical fiber and at least one conductive wire. The optical device includes one of an optical connector, an optical port, a flexible network access point, and a transceiver.

In a further exemplary embodiment, the present invention provides a fiber optic cable for use with a retractable optical optic tether assembly or the like, the fiber optic cable including: a matrix or jacket material; and at least one optical fiber disposed within the matrix or jacket material; wherein the fiber optic cable has a predetermined bending characteristic. The at least one optical fiber includes at least one of a tight-buffered optical fiber and a ribbonized optical fiber. Optionally, the fiber optic cable also includes at least one conductive wire disposed within the matrix or jacket material. Optionally, the predetermined bending characteristic of the fiber optic cable is provided by a layer of material that has the predetermined spring characteristic disposed about the conductive wire. Alternatively, the predetermined bending characteristic of the fiber optic cable is provided by at least one anti-flexion member that is disposed one of within the matrix or jacket material and on an outer surface of the matrix or jacket material.

It is to be understood that both the foregoing general description and the following detailed description provide exemplary embodiments of the present invention, and an overview or framework for understanding the nature and character of the present invention as it is claimed. The accompanying drawings are included in order to provide a further understanding of the present invention, and are incorporated into and constitute a part of this specification. The accompanying drawings illustrate the various exemplary embodiments of the present invention and, together with the detailed description, serve to explain the principles of operation thereof. The accompanying drawings are meant to be illustrative, and not limiting.

BRIEF DESCRIPTION OF THE DRAWINGS

The present invention is illustrated and described herein with reference to the various drawings, in which like reference numbers are used to denote like system/assembly components and/or method steps, as appropriate, and in which:

FIG. 10 is a cross-sectional end view of a still further exemplary embodiment of a single-fiber fiber optic cable of the present invention, the fiber optic cable again including a parallel aramid yarn for tensile strength and crush protection.

DETAILED DESCRIPTION OF THE INVENTION

In various exemplary embodiments, the present invention provides an optical system that allows for the flexible location of an optical device that is coupled to a patch panel in a wiring closet or other optical signal source through a series of fiber optic cables and optical connections, or the flexible location of an array of such optical devices. The optical system includes, in part, one or more retractable optical fiber tether assemblies that each allow varying lengths of tether cable to be pulled and used. The retraction device of each of the optical tether assemblies may be disposed mid-tether cable, or may terminate the respective tether cable and incorporate the given optical device. In the exemplary WLAN application, each of the retractable optical fiber tether assemblies includes an integral transceiver and associated software. Thus, each of the retractable optical fiber tether assemblies functions as an antenna. The associated fiber optic cable carries both optical fiber to provide optical continuity and copper wire to provide electrical conductivity to the antenna array.

Figure 1:
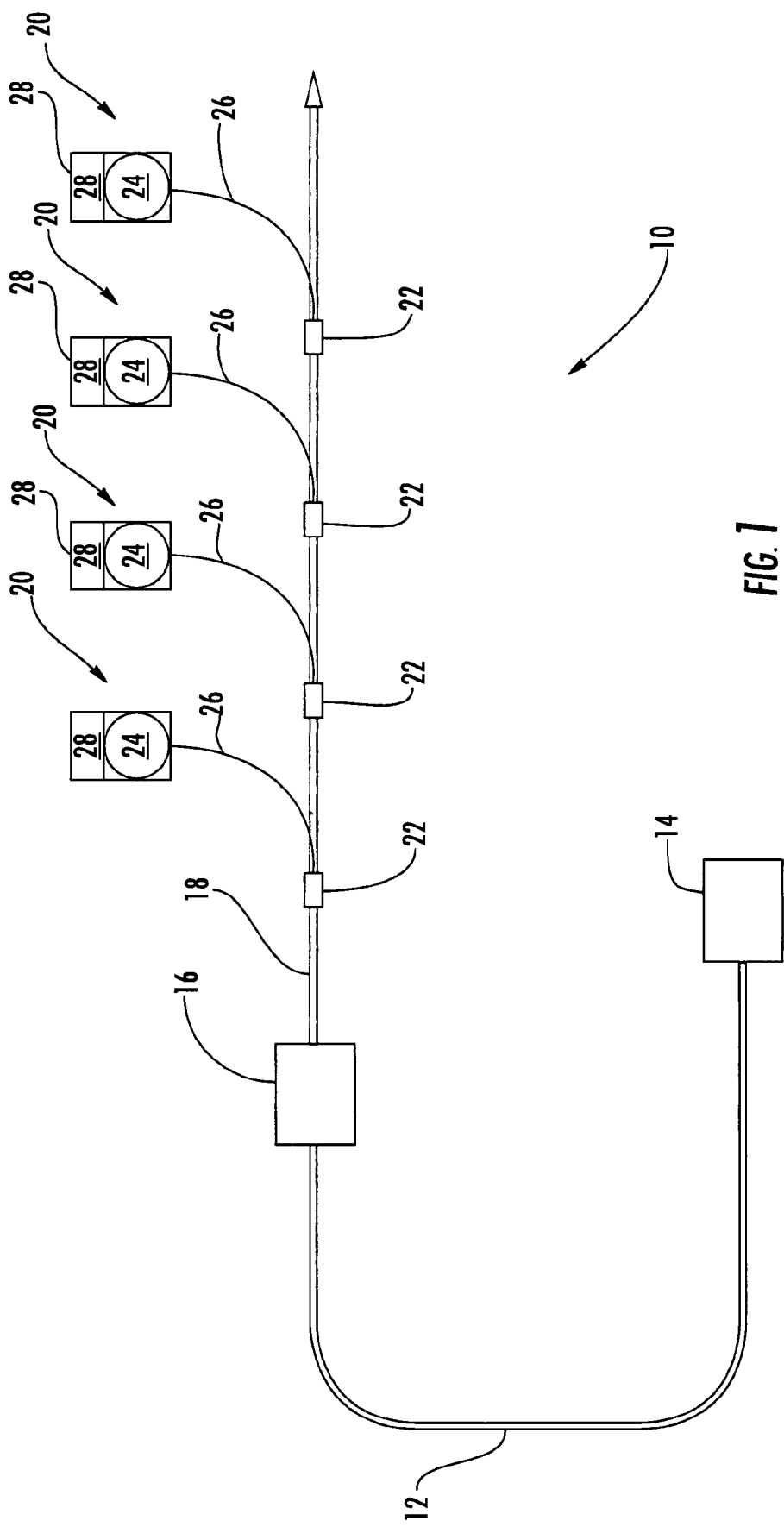
FIG. 1 is a schematic view of one exemplary embodiment of the optical system of the present invention, the optical system including one or more retractable optical fiber tether assemblies.

Referring to FIG. 1, in one exemplary embodiment, the optical system 10 of the present invention includes a tail cable 12 that optically couples a patch panel in a wiring closet or other optical signal source 14 at one location to multiple optical connectors, a coupler, or the like 16 at another location. These locations may be separated by a matter of feet, yards, miles, etc. An array cable 18 optically couples the optical connectors, coupler, or the like 16 to one or more retractable tether cable assemblies 20 at one or more access points 22, such as one or more FLEXNAPS or the like. Optionally, the tail cable 12 and the array cable 18 are integrally formed. The array cable 18 includes a pulling grip for pulling the array cable 18 over distances, through walls, ceilings, etc., typically through a conduit. The retractable tether cable assemblies 20, which are preferably pre-connectorized, then bring the optical signal to multiple other locations. The retractable tether cable assemblies 20 provide location flexibility and obviate the need for neatly coiling the tether cable, such that an array of optical devices may be installed with minimal effort and expense. The retractable tether cable assemblies 20 are also easier and cheaper to package and ship than conventional tether cables. Each of the retractable tether cable assemblies 20 includes a retraction mechanism 24, one or more fiber optic cables 26, and an optical device 28, as described in greater detail herein below. The optical device 28 may be one or more optical connectors or ports, a FLEXNAP, a transceiver and associated software in the exemplary WLAN application (also described in greater detail herein below), etc.

Figure 2:
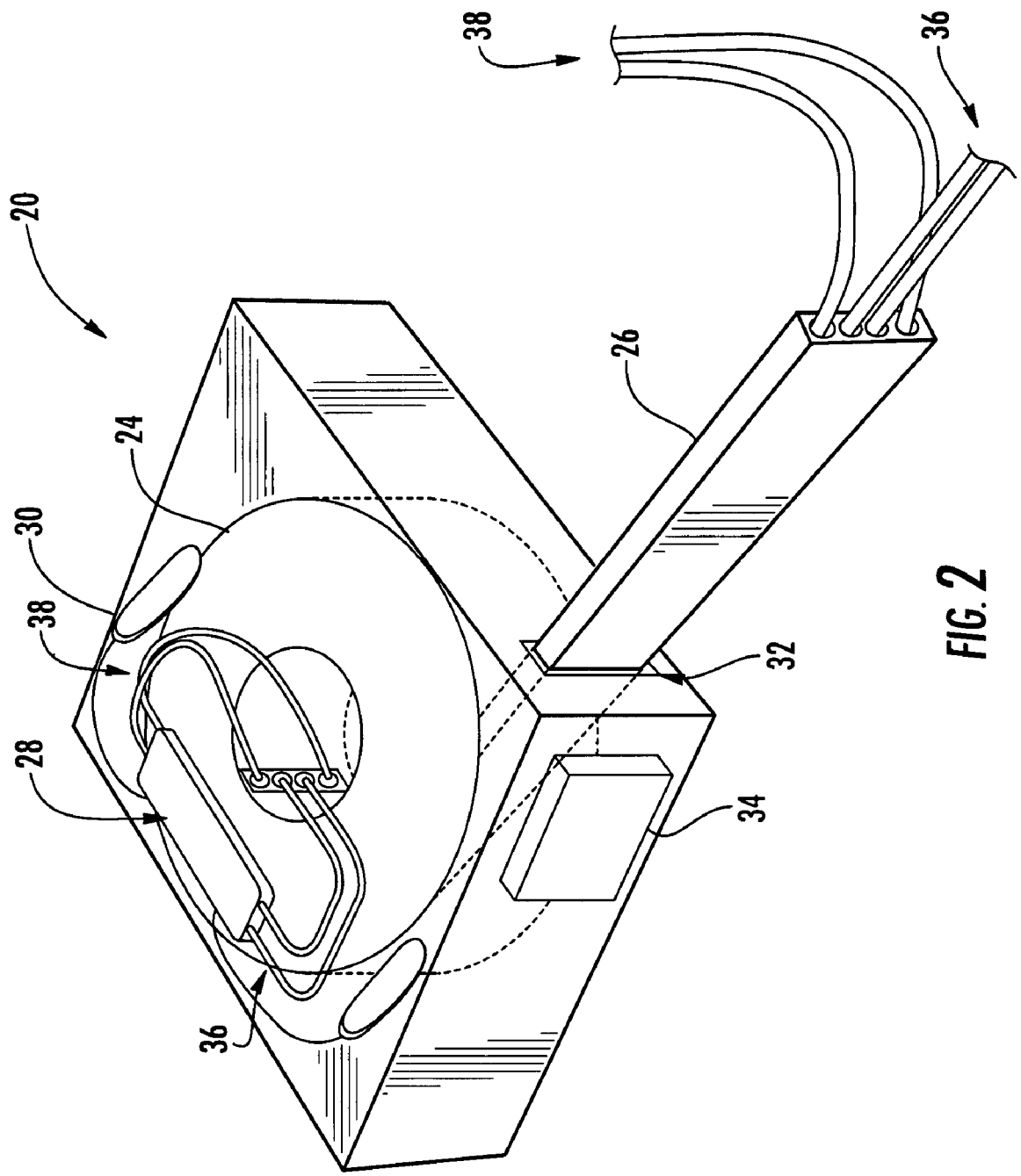
FIG. 2 is a perspective view of one exemplary embodiment of one of the retractable optical fiber tether assemblies of FIG. 1, the retractable optical fiber tether assembly including a retraction mechanism, a tether cable, and an integrated optical device (a transceiver and associated software are illustrated)

Referring to FIG. 2, in one exemplary embodiment, the retractable tether cable assembly 20 includes a housing 30. The retraction mechanism 24 is disposed within the housing 30, as is the optical device 28. Preferably, the retraction mechanism 24 includes a spool and spring mechanism or the like that is operable for alternatively feeding out or taking up tether cable 26 through a port 32 manufactured into the housing 30. The retraction mechanism 24 also includes a locking mechanism 34 that partially protrudes through the housing 30 and is operable for selectively enabling/disabling the feeding out/taking up of the tether cable 26. A comparable retraction mechanism that is suitable for use with the present invention is disclosed in commonly-assigned U.S. Pat. No. 6,915,058 to Pons, the contents of which are incorporated in full by reference herein. Although a single-port housing 30 is illustrated in FIG. 2, a multi-port housing 30 could also be used, allowing the tether cable 26 to be fed out or taken up from multiple sides of the housing 30 at once. In such an embodiment, the housing 30 and retraction mechanism 24 are disposed mid-tether cable, and the optical device 28 represents a separate component disposed at the terminating end of the tether cable 26. As illustrated in FIG. 2, the optical device 28 is a transceiver and associated software which are disposed within the housing 30. Alternatively, the transceiver and associated software are disposed on an outer surface of the housing 30. Because the transceiver is both optical and electrical, the tether cable 26 carries both optical fiber 36 to provide optical continuity and copper wire 38 to provide electrical conductivity to the transceiver. As described above, the optical device 28 could be any optical component, such as one or more optical connectors or ports, a FLEXNAP, etc. As described in greater detail herein below, the tether cable 26 may also carry one or more strength members, one or more anti-flexion members, etc., and may be of a substantially flat shape, a substantially round shape, etc. All of these characteristics make the retraction and storage of the tether cable 26 possible.

In general, the performance of optical fibers is greatly affected by small-radius bends. For example, standard single-mode fiber experiences high optical attenuation at small-radius bends. Advanced optical fibers developed by Corning Incorporated, including nanostructured fibers, experience significantly less optical attenuation at small-radius bends, with a few bends at a 5-mm radius and numerous bends at a 10-mm radius being acceptable without significant optical attenuation. The retraction mechanism 24 of the present invention includes a bend-limiting feature that exploits these advances in a small form factor.

Figure 3:
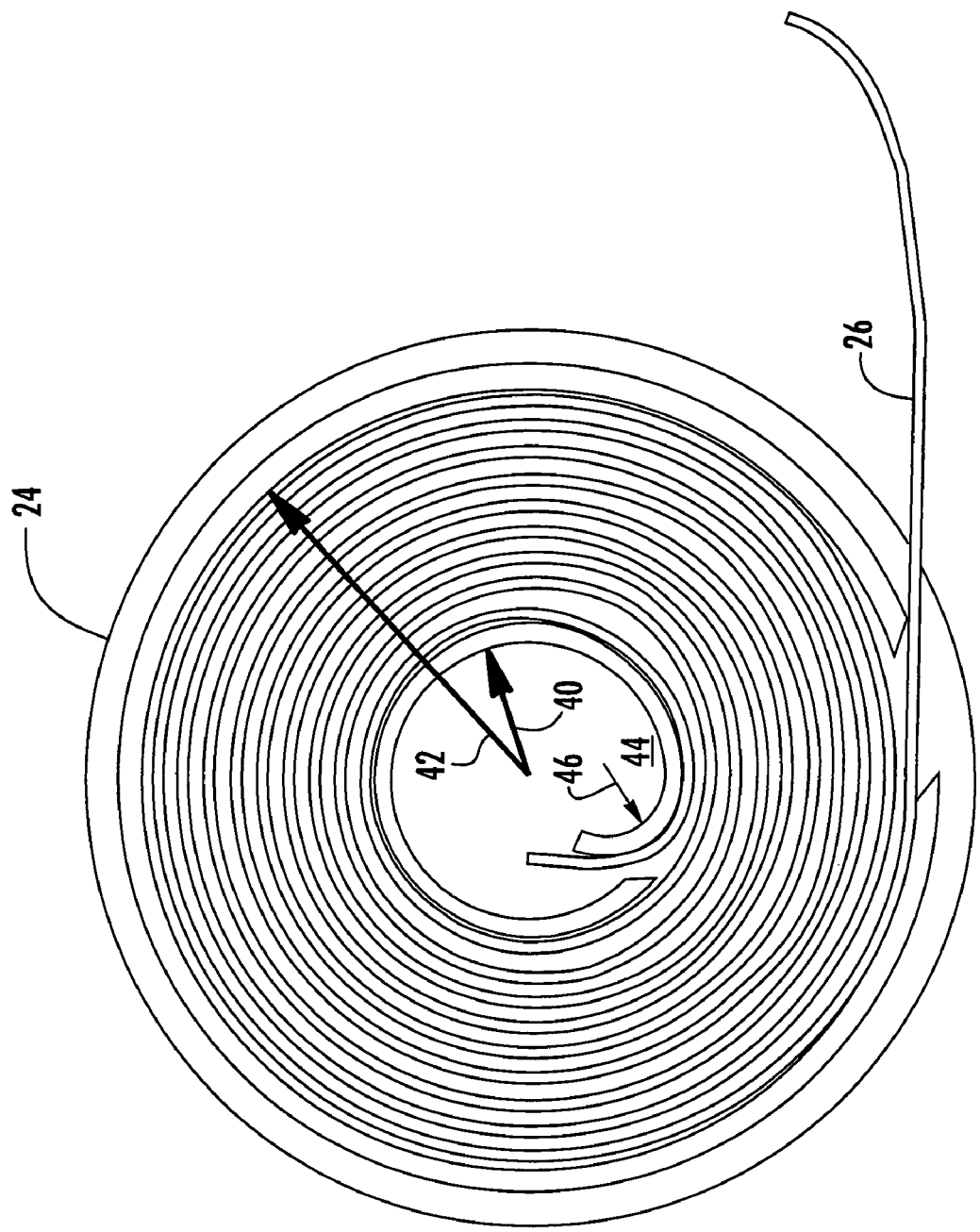
FIG. 3 is a cross-sectional top view of one exemplary (single-port) embodiment of the retraction mechanism of FIGS. 1 and 2, highlighting a bend-limiting feature of the spool.
Figure 4:
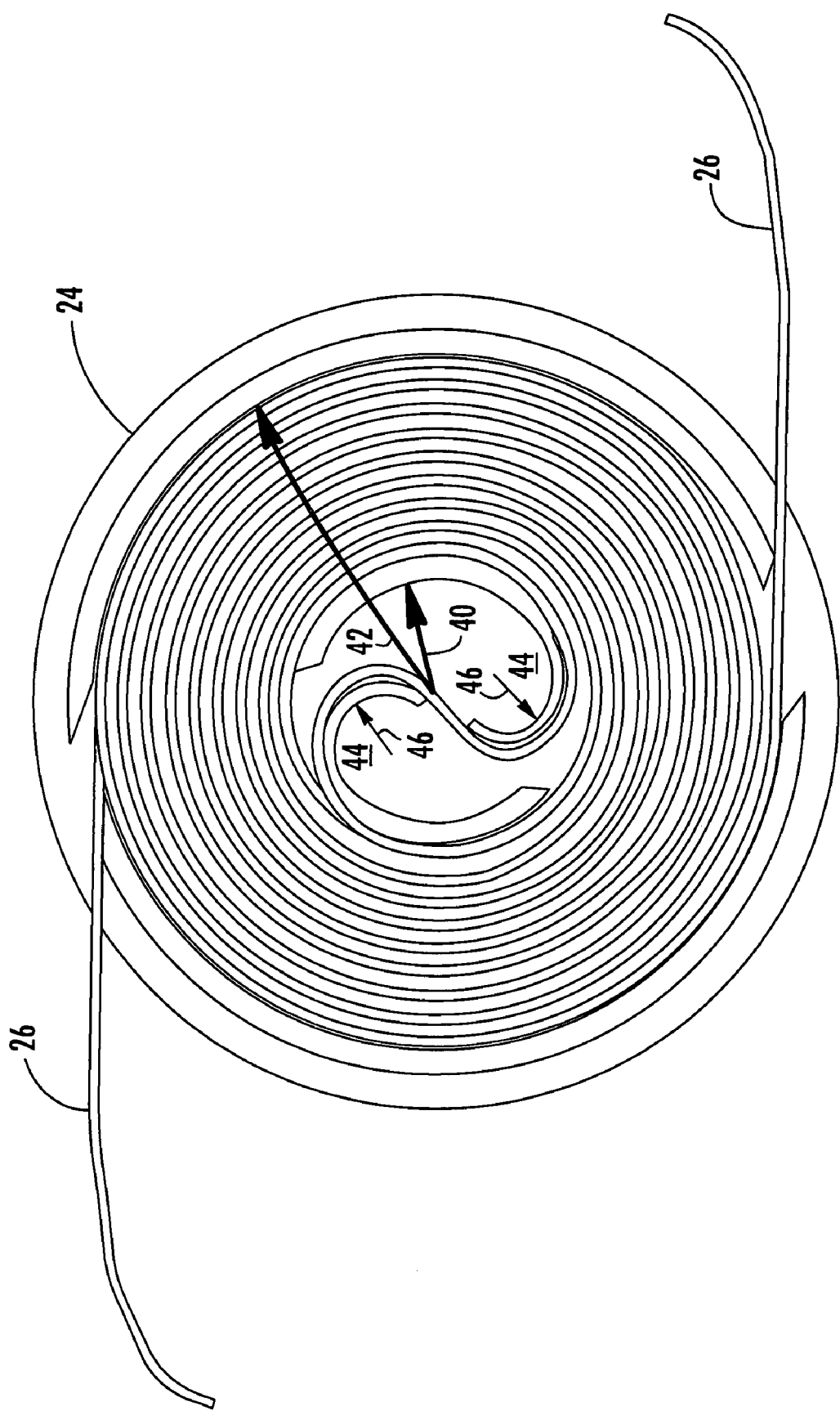
FIG. 4 is a cross-sectional top view of another exemplary (dual-port) embodiment of the retraction mechanism of FIGS. 1 and 2, again highlighting a bend-limiting feature of the spool.

Referring to FIGS. 3 and 4, in two exemplary (single-port and dual-port) embodiments, the retraction mechanism 24 has an inner radius 40 of greater than about 10 mm and an outer radius 42 that is greater than that (e.g., about 27.5 mm), such that when the tether cable 26 is spooled between the inner radius 40 and the outer radius 42, significant optical attenuation is avoided. The bend limiting feature 44 has a radius 46 of greater than about 5 mm, such that when the tether cable 26 is retained by the bend limiting feature 44, significant optical attenuation is avoided. A retraction mechanism 24 sized on the order of the dimensions provided would have an extractable tether cable length of about 500 mm, assuming an optical fiber thickness of about 0.9 mm and that about 10 loops are disposed within the carousel. If the outer radius 42 is extended to 35 mm, for example, the retraction mechanism 24 would have an extractable tether cable length of about 1000 mm. Thus, a housing 30 (FIG. 2) having a width of just over 3 inches would provide meters of tether cable 26.

The spring action required for retraction of the tether cable 26 is accomplished by providing the tether cable 26 with a predetermined bending or spring characteristic, via the selection of materials and/or the incorporation of one or more strength members, one or more anti-flexion members, etc. Preferably, the tether cable 26 is of a substantially flat shape, a substantially round shape, etc. A substantially round-shaped tether cable 26 is typically used when the desired bending or spring characteristic is provided by an external spring (not illustrated) or the like disposed within the retraction mechanism 24.

Figure 5:
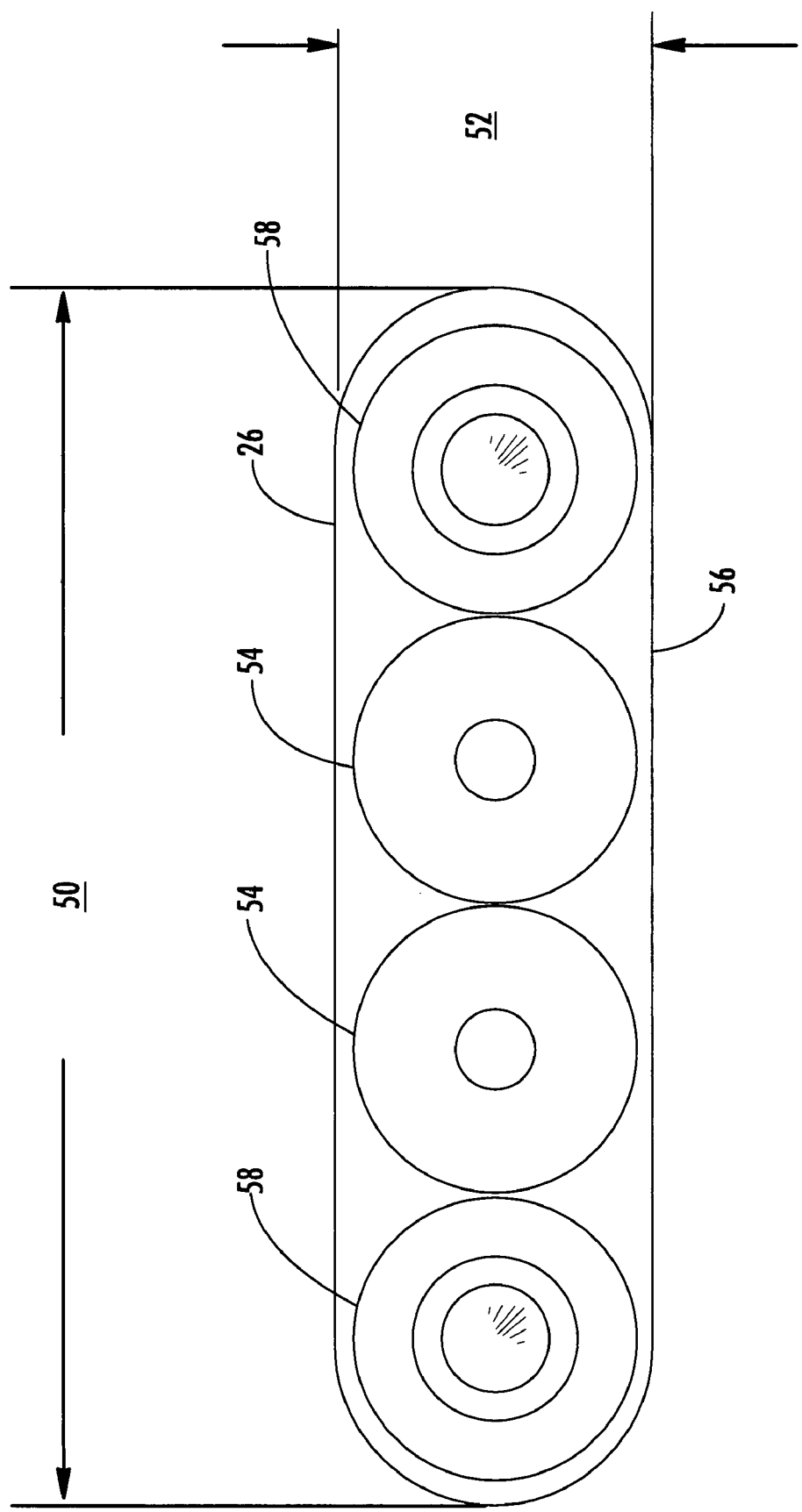
FIG. 5 is a cross-sectional end view of one exemplary embodiment of the tether cable of the present invention, the tether cable including a pair of tight-buffered optical fibers and a pair of copper-clad spring steel strength/anti-flexion members.

Referring to FIG. 5, in one exemplary embodiment, the tether cable 26 of the present invention is substantially flat shaped with a width 50 of about 3.8 mm and a thickness 52 of about 1 mm, although it will be readily apparent to those of ordinary skill in the art that other suitable dimensions may be used. The tether cable 26 includes a pair of tight-buffered optical fibers 54 disposed within an ultraviolet (UV)-curable matrix material 56. The matrix material 56 includes a silicone component that acts as a solid-film lubricant when the tether cable 26 is spooled/unspooled. The tether cable 26 also includes a pair of copper-clad spring steel strength/anti-flexion members 58. Optionally, the spring steel is silicon-manganese steel or chrome-vanadium steel. These strength/anti-flexion members 58 provide the desired electrical conductivity in WLAN antenna array and other similar applications. It will be readily apparent to those of ordinary skill in the art that other suitable materials and configurations may be used.

Figure 6:
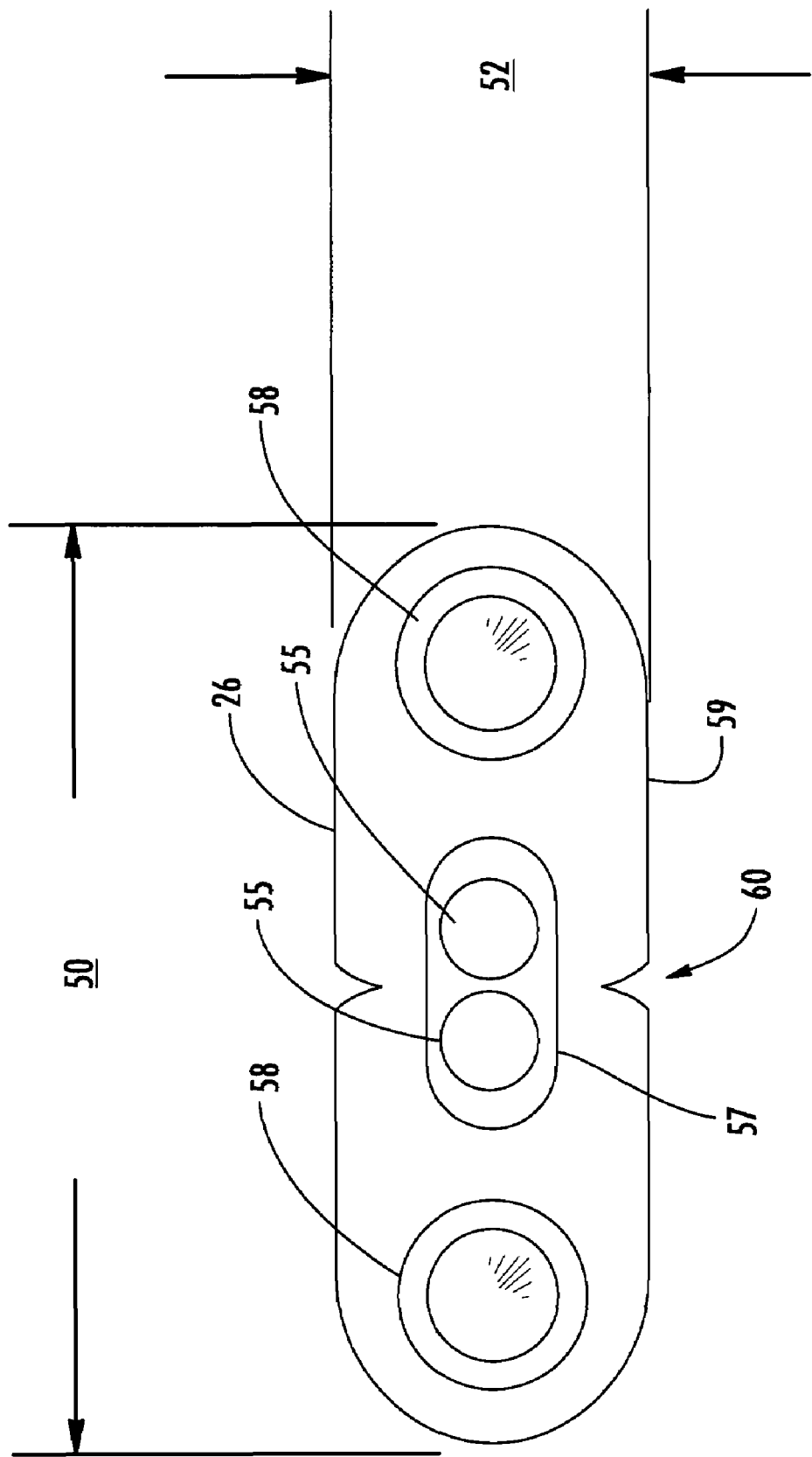
FIG. 6 is a cross-sectional end view of another exemplary embodiment of the tether cable of the present invention, the tether cable including a pair of optical fibers disposed within a ribbon and a pair of copper-clad spring steel strength/anti-flexion members.

Referring to FIG. 6, in another exemplary embodiment, the tether cable 26 of the present invention is substantially flat shaped with a width 50 of about 2.5 mm and a thickness 52 of about 0.9 mm, although it will be readily apparent to those of ordinary skill in the art that other suitable dimensions may be used. The tether cable 26 includes a pair of optical fibers 55 disposed within a ribbon 57, instead of being tight-buffered. The ribbon 57 is disposed within a jacket 59 made of a flame retardant material, such as polyvinylidene diflouride (PVDF) or highly-filled polyvinyl chloride (PVC). Thus, in this embodiment, the tether cable 26 is designed to achieve a plenum flame rating. The jacket 59 also acts as an insulator. Again, the tether cable 26 includes a pair of copper-clad spring steel strength/anti-flexion members 58. Optionally, the spring steel is silicon-manganese steel or chrome-vanadium steel. These strength/anti-flexion members 58 provide the desired electrical conductivity in WLAN antenna array and other similar applications. Further, the tether cable 26 includes a pair of access point stress risers 60 that enable easy tearing of the jacket 59 so that the optical fibers 55 may be accessed. It will be readily apparent to those of ordinary skill in the art that other suitable materials and configurations may be used.

Figure 7:
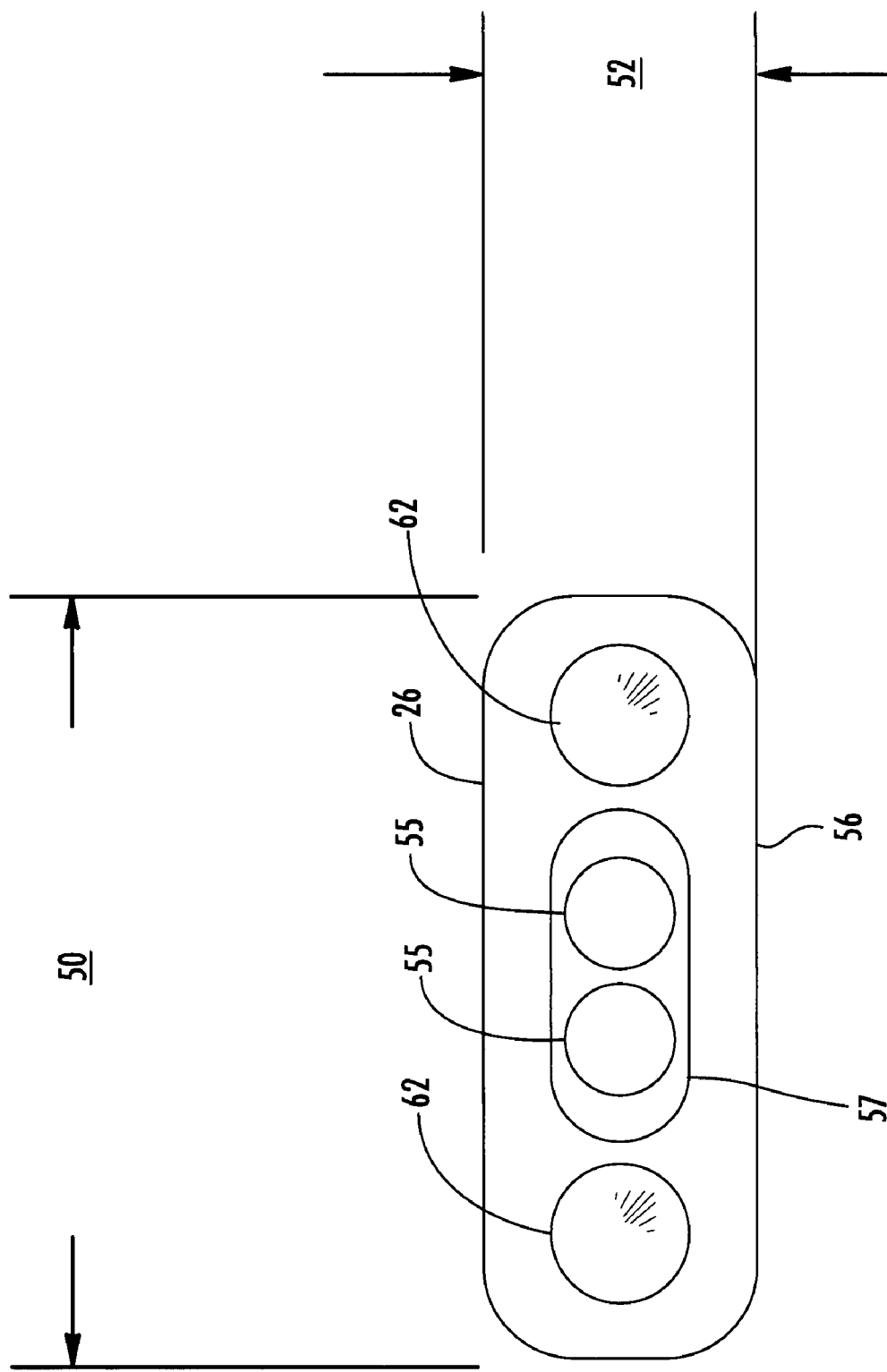
FIG. 7 is a cross-sectional end view of a further exemplary embodiment of the tether cable of the present invention, the tether cable including a pair of optical fibers disposed within a ribbon and a pair of copper conductive members.

Referring to FIG. 7, in a further exemplary embodiment, the tether cable 26 of the present invention is substantially flat shaped with a width 50 of about 1.8 mm and a thickness 52 of about 0.6 mm, although it will be readily apparent to those of ordinary skill in the art that other suitable dimensions may be used. Again, the tether cable 26 includes a pair of optical fibers 55 disposed within a ribbon 57, instead of being tight-buffered. The ribbon 57 is disposed within a UV-curable matrix material 56. The matrix material 56 includes a silicone component that acts as a solid-film lubricant when the tether cable 26 is spooled/unspooled. The matrix material 56 also acts as an insulator. The tether cable 26 also includes a pair of copper conductive members 62. These conductive members 62 provide the desired electrical conductivity in WLAN antenna array and other similar applications. Preferably, a short length of spring steel or the like (not illustrated) is attached to the tether cable 26 in order to provide the tether cable 26 with the desired bending or spring characteristic. Optionally, the spring steel is silicon-manganese steel or chrome-vanadium steel. In this embodiment, a coiled spring or the like (not illustrated) is disposed beneath the rotating flange of the retraction mechanism 24 (FIGS. 1-4) in order to provide the desired retraction force. It will be readily apparent to those of ordinary skill in the art that other suitable materials and configurations may be used.

In order to further increase the strength of the tether cable(s) 26 (FIGS. 5-7), one or more strength members, such as aramid yarn, fiberglass yarn, etc., may be used. Optionally, these strength members are disposed between the optical fibers 54 and 55 (FIGS. 5-7) and the conductive members 62 (FIG. 7).

Figure 8:
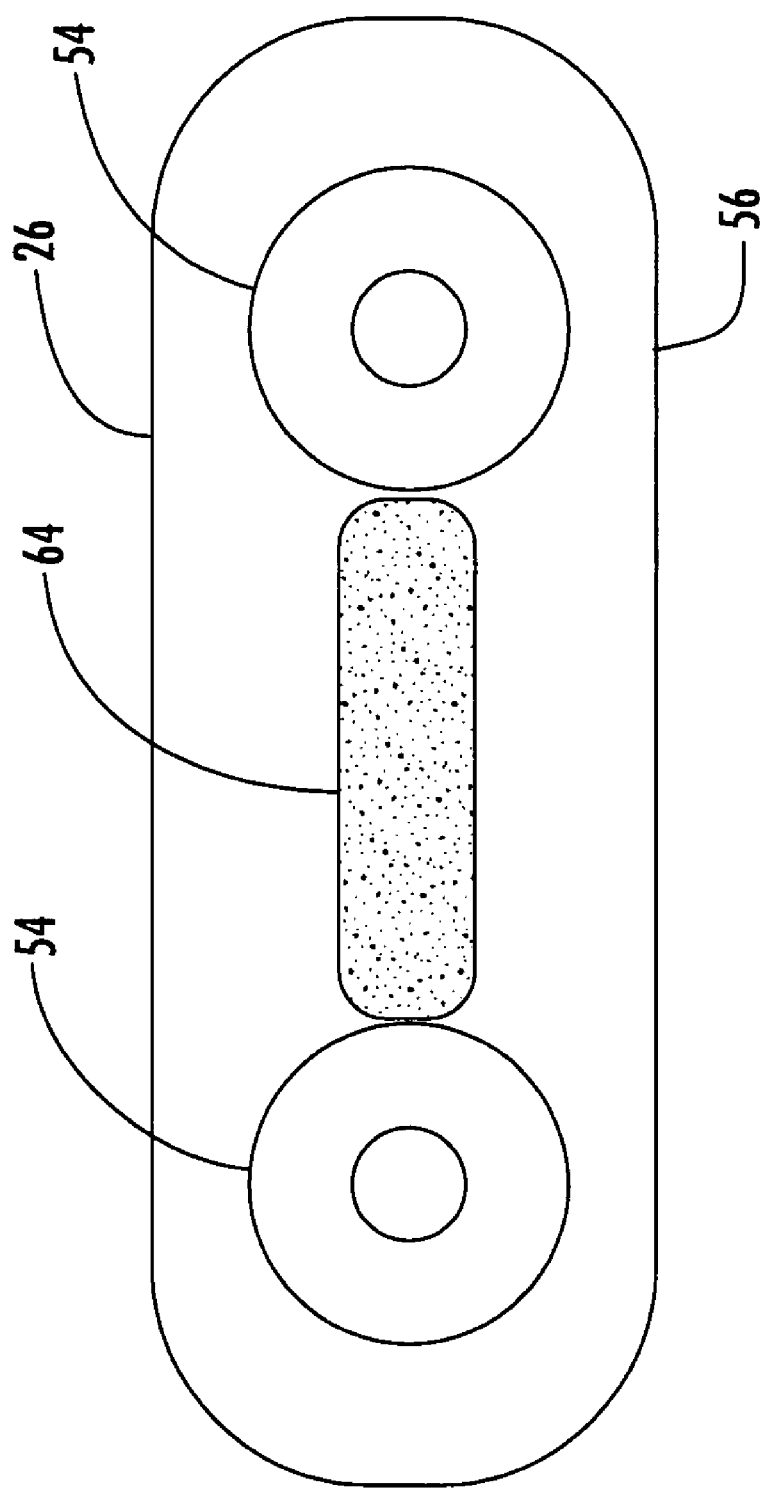
FIG. 8 is a cross-sectional end view of a still further exemplary embodiment of the tether cable of the present invention, the tether cable including a pair of tight-buffered optical fibers and a substantially flat shaped strength/anti-flexion member.

Referring to FIG. 8, in a still further exemplary embodiment, the tether cable 26 of the present invention again includes a pair of tight-buffered optical fibers 54 disposed within a UV-curable matrix material 56. The matrix material 56 includes a silicone component that acts as a solid-film lubricant when the tether cable 26 is spooled/unspooled. The tether cable 26 also includes a substantially flat shaped glass-reinforced plastic (GRP) strength/anti-flexion member 64 or the like (e.g., alternatively, a pair of substantially round shaped GRP strength/anti-flexion members). This strength/anti-flexion member 64 provides the tether cable 26 with the desired bending or spring characteristic, in a case in which electrical conductivity is not required. Preferably, the strength/anti-flexion member 64 has a (collective) width that is about three times its thickness in order to minimize twisting of the tether cable 26 during extension/retraction.

Current manufacturing techniques for multi-fiber, tight-buffered fiber optic cables involve stranding both the optical fibers and the aramid yarns. Stranding increases flexibility, and allows for lower-stress bending. When a unit is stranded, there are regions of tension and compression in the unit that may be relieved by longitudinal movement of the unit. However, stranding limits linespeed and production throughput. For example, current manufacturing techniques run at an optical fiber lay length of about 250 mm and an aramid yarn lay length of about 400 mm. For these empirically-established lay lengths, linespeeds are limited to about 40 mpm for low-speed servers and 100 mpm for high-speed servers. These limitations are driven by the functional stability of the aramid yarn packages. In addition, the current run lengths are limited to aramid yarn lengths as held on the cop. The application of a parallel aramid yarn would allow for the switching out of the aramid yarn on the fly, preventing having to bring the line down to set up new aramid yarn packages. The elimination of stranding would also eliminate dibbers and outer-layer fiber oscillators, depending on the fiber optic cable diameter. This would shorten manufacturing line footprints, reduce equipment costs, and simplify setup.

Optical fiber steps present a manufacturing yield problem with small-diameter, single-fiber cables. This problem is caused by shrinkage of the jacket materials over time. These steps show up after manufacturing and result in fiber optic cables that need reworking, or are scrapped.

Again, in general, the performance of optical fibers is greatly affected by small-radius bends. For example, standard single-mode fiber experiences high optical attenuation at small-radius bends. Advanced optical fibers developed by Corning Incorporated, including nanostructured fibers, experience significantly less optical attenuation at small-radius bends, with a few bends at a 5-mm radius and numerous bends at a 10-mm radius being acceptable without significant optical attenuation.

Figure 9:
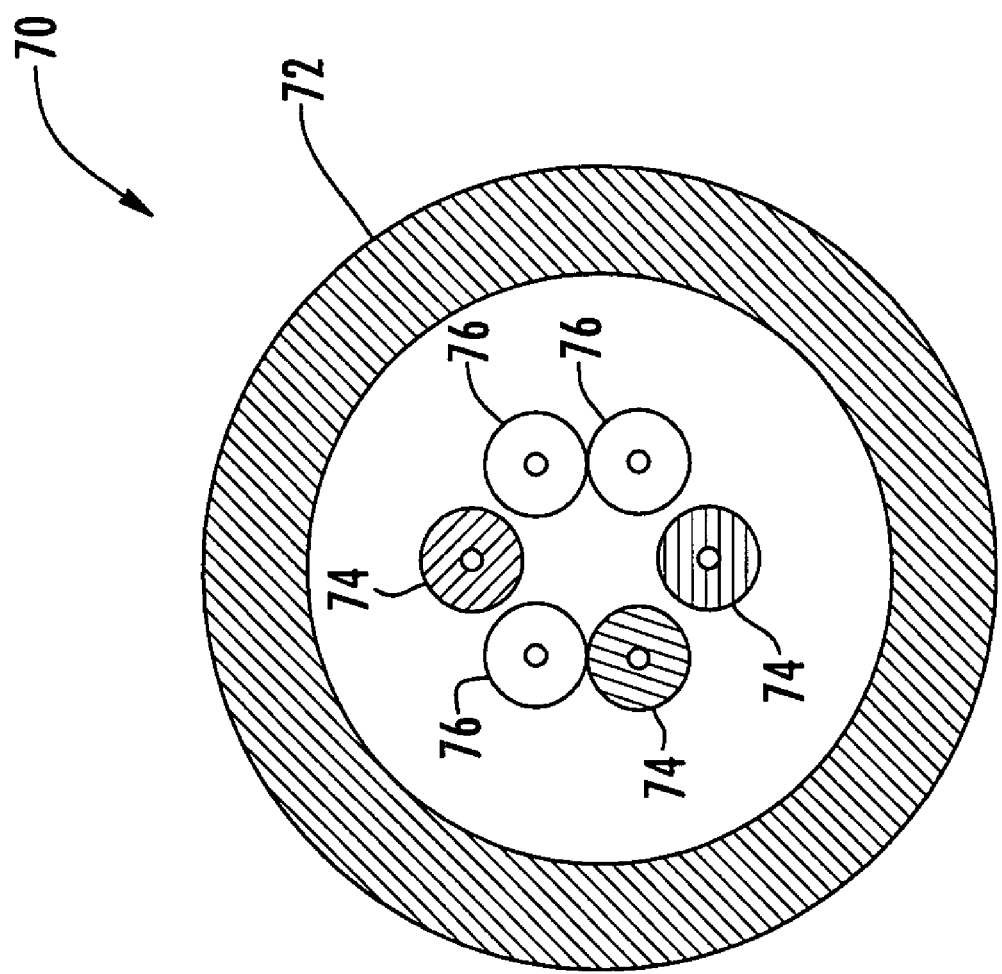
FIG. 9 is a cross-sectional end view of a still further exemplary embodiment of a tight-buffered fiber optic cable of the present invention, the fiber optic cable including a parallel aramid yarn for tensile strength and crush protection.

As a result of the above, several other fiber optic cable configurations are presented herein. The first configuration is a family of multi-fiber fiber optic cables with single-mode optical fibers. The fiber optic cables may contain up to twenty-four tight buffers. Referring to FIG. 9, in one exemplary embodiment (i.e. a six-fiber design), the fiber optic cable 70 includes a jacket 72 that typically consists of a PVC material. The jacket material is selected to meet either plenum or riser flame performance requirements. The aramid yarn 74 provides tensile strength and protects the optical fibers 76 from crush. The optical fibers 76 are generally stranded in the cable, but may also be parallel based on the ability of the optical fiber to reduce bending attenuation. The second configuration is a family of single and multi-fiber fiber optic cables with single-mode optical fibers. Referring to FIG. 10, in another exemplary embodiment (i.e. a one-fiber design), the fiber optic cable 80 includes a jacket 82 that typically consists of a PVC material. Again, the jacket material is selected to meet either plenum or riser flame performance requirements. The aramid yarn 84 surrounds the optical fiber(s) 86, which are either stranded in the fiber optic cable 80 or payed-off parallel in a non-stranded configuration. In either of these exemplary embodiments, the fiber optic cable 70 and 80 may have a ripcord or the like for easy access.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An optical system, comprising:
   a fiber optic cable;
   a retractable fiber optic cable storage device operatively associated with the fiber optic cable;
   an optical device operatively associated with the fiber optic cable; and
   a fiber optic array cable coupled to the fiber optic cable at an access point;
   wherein the retractable fiber optic cable storage device is operatively associated with the fiber optic cable such that the optical device may be flexibly located relative to the fiber optic array cable and the access point, and
   the fiber optic cable comprises at least one optical fiber and at least one conductive wire, and wherein the fiber optic cable has a predetermined spring characteristic.

2. The optical system of claim 1, wherein the fiber optic cable comprises a fiber optic tether cable.

3. The optical system of claim 1, wherein the retractable fiber optic cable storage device is operable for selectively storing, reeling out, and reeling in the fiber optic cable.

4. The optical system of claim 1, wherein the retractable fiber optic cable storage device is disposed along a middle-portion of the fiber optic cable and the optical device is disposed at a terminating portion of the fiber optic cable.

5. The optical system of claim 1, wherein the retractable fiber optic cable storage device and the optical device are disposed at a terminating portion of the fiber optic cable.

6. The optical system of claim 5, wherein the retractable fiber optic cable storage device and the optical device are disposed within an integrated housing.

7. The optical system of claim 1, wherein the optical device comprises an optical device selected from the group consisting of an optical connector, an optical port, a flexible network access point, and a transceiver.

8. An optical system, comprising:
   a fiber optic cable;
   a retractable fiber optic cable storage device operatively associated with the fiber optic cable, the retractable fiber optic cable storage device comprising a retraction mechanism operable for selectively storing, reeling out, and reeling in the fiber optic cable;
   an optical device disposed at a terminating portion of the fiber optic cable; and
   a fiber optic array cable coupled to the fiber optic cable at an access point,
   wherein the retractable fiber optic cable storage device is operatively associated with the fiber optic cable such that the optical device may be flexibly located relative to the fiber optic array cable and the access point, and
   wherein the fiber optic cable comprises at least one optical fiber and at least one conductive wire.

9. The optical system of claim 8, wherein the optical device comprises an optical device selected from the group consisting of an optical connector, an optical port, a flexible network access point, and a transceiver.

* * * * *